(12) United States Patent
Perlin et al.

(10) Patent No.: US 9,760,093 B2
(45) Date of Patent: Sep. 12, 2017

(54) MANIPULATION OF OBJECTS

(71) Applicants: Kenneth Perlin, New York, NY (US); Daniel A. Rosenfeld, New York, NY (US); Joel S. Kollin, New York, NY (US)

(72) Inventors: Kenneth Perlin, New York, NY (US); Daniel A. Rosenfeld, New York, NY (US); Joel S. Kollin, New York, NY (US)

(73) Assignee: New York University, New York, NY (US)

(\*) Notice: Subject to any disclaimer, the term of this patent is extended or adjusted under 35 U.S.C. 154(b) by 0 days.

(21) Appl. No.: 14/273,151

(22) Filed: May 8, 2014

(65) Prior Publication Data

US 2014/0244035 A1  Aug. 28, 2014

Related U.S. Application Data

(63) Continuation of application No. 12/586,595, filed on Sep. 24, 2009, now Pat. No. 8,725,292, which is a (Continued)

(51) Int. Cl.
*G06F 19/00* (2011.01)
*G05D 1/02* (2006.01)
*G09B 9/04* (2006.01)

(52) U.S. Cl.
CPC ............ *G05D 1/0231* (2013.01); *G09B 9/04* (2013.01)

(58) Field of Classification Search
CPC ................................ G05D 1/0231; G09B 9/04
(Continued)

(56) References Cited

U.S. PATENT DOCUMENTS 4,119,900 A * 10/1978 Kremnitz ............. G05B 13/047
318/580
4,398,720 A *  8/1983 Jones .................. A63F 3/00643
273/238

(Continued)

OTHER PUBLICATIONS

The metaDesk: Models and Prototypes for Tangile User Interface, Oct. 14-17, 1997, Brygg Ullmer and Hiroshi Ishii.*

(Continued)

*Primary Examiner* — Ian Jen
(74) *Attorney, Agent, or Firm* — Ansel M. Schwartz

(57) ABSTRACT

A system for manipulation of objects. The system includes N objects, where N is greater than or equal to 2 and is an integer; and a mechanism for controlling and 2D locating of the N objects. A method for manipulating objects. The method includes the steps of receiving information from N objects, where N is greater than or equal to 2 and is an integer, at a centrally controlling and 2D locating controller; determining 2D locations by the controller of the N objects; and transmitting from the controller directions to the N objects for the N objects to move. An apparatus for tracking. The apparatus includes N objects, where N is greater than or equal to 2 and is an integer, each object having an emitter which emits light; and a mechanism for 2D sensing of the N objects over time from the light emitted by each emitter. The present invention pertains to a method for tracking. The method includes the steps of emitting light from N objects, where N is greater than or equal to 2 and is an integer; and sensing 2D locations of the N objects over time from the emitted light from the N objects.

4 Claims, 17 Drawing Sheets

Related U.S. Application Data continuation of application No. 10/822,133, filed on Apr. 9, 2004, now abandoned.

(60) Provisional application No. 60/463,496, filed on Apr. 17, 2003.

(58) Field of Classification Search
USPC .......................................................... 700/245
See application file for complete search history.

(56) References Cited

U.S. PATENT DOCUMENTS

| | | | | |
|---|---|---|---|---|
| 4,796,198 | A * | 1/1989 | Boultinghouse | G01S 17/06 180/167 |
| 4,987,540 | A * | 1/1991 | Luke, Jr. | G05D 1/0265 180/168 |
| 5,257,787 | A * | 11/1993 | Miccio | A63F 3/02 273/260 |
| 6,981,700 | B2 * | 1/2006 | Syed | A63F 3/02 273/242 |
| RE43,756 | E * | 10/2012 | Christopher | F41B 11/53 124/48 |
| 2004/0024490 | A1 * | 2/2004 | McLurkin | G06N 3/008 700/245 |
| 2004/0065999 | A1 * | 4/2004 | Syed | A63F 3/02 273/260 |
| 2004/0210344 | A1 * | 10/2004 | Hara | B64C 33/025 700/245 |
| 2005/0065649 | A1 * | 3/2005 | Rosenfeld | G05D 1/0231 700/245 |
| 2009/0267741 | A1 * | 10/2009 | Li | H04Q 9/00 340/10.1 |
| 2010/0020201 | A1 * | 1/2010 | Chao | G06T 3/4038 348/239 |
| 2010/0042291 | A1 * | 2/2010 | Baier | B60G 17/06 701/37 |

OTHER PUBLICATIONS

Sensetable: A wireless Object Tracking Platform for Tangile User Interfaces, Mar. 31-Apr. 5, 2001, Jame Patten, Hiroshi Ishii, Jim Hines and Gian Pangaro.*

NPL: Refraction, Snell's law, and total internal reflection; Date:Mar. 20, 1998.*

* cited by examiner

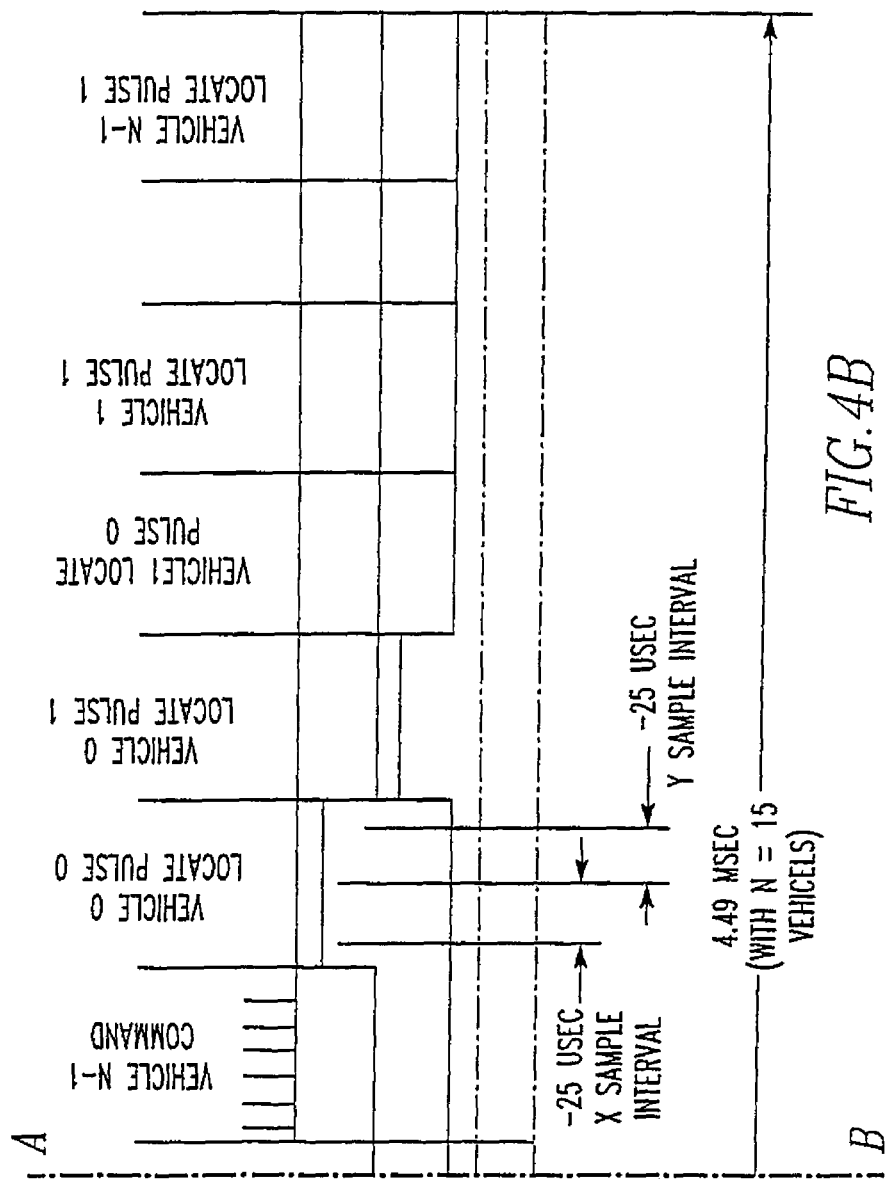

SPRING MOUNTED TEFLON SKIDS    IR "LOCATER" LED

MANIPULATION OF OBJECTS

CROSS-REFERENCE TO RELATED APPLICATIONS

This is a continuation of U.S. patent application Ser. No. 12/586,595 filed Sep. 24, 2009, now U.S. Pat. No. 8,725, 292, which is a continuation of U.S. patent application Ser. No. 10/822,133 filed Apr. 9, 2004, which claims priority from U.S. provisional application 60/463,496 filed Apr. 17, 2003, all of which are incorporated by reference herein.

FIELD OF THE INVENTION

The present invention is related to the 2D tracking of N objects, where N is an integer greater than or equal to 2. More specifically, the present invention is related to the 2D tracking of N objects, where N is an integer greater than or equal to 2 with a centralized control and 2D locating a controller.

BACKGROUND OF THE INVENTION

Our human brains are particularly good at solving problems when we are able to make use of our physical and propriocentric intuition, yet current computer interfaces make little use of these abilities. The hypothesis underlying the present invention is that interaction mediated by active computer-controlled objects will improve understanding and collaboration in many types of simulations for which screen-based interaction is not optimal. Current methods to affect such a capability are either expensive or limited in important ways.

The present invention is a practical, flexible and low cost planar manipulator display that can simultaneously move dozens of physical objects upon a surface under computer control and sense movement of those objects by users, as shown in FIGS. 1 and 3. Specifically, (i) Each of many physical objects can be moved quickly, accurately and independently upon a surface, (ii) the positions of the objects can be accurately sensed (iii) the mechanism scales gracefully to surfaces of large area, and (iv) the cost per movable object does not exceed several dollars, thereby enabling widespread application in laboratories, classrooms, and eventually the home.

Such a device could be used in conjunction with a projection display, which projects information upon the surface, and applications in which users' directives are recognized via vision-based gesture recognition and voice recognition. Work between two or more co-located collaborators can be aided by such an information tool, by making use of shared proprioception (body-space awareness).

Applications could include military scenario simulation, studies of the flow and interaction of people in social or emergency evacuation situations, automotive traffic testing and evaluation, interactive algorithms for arrangement of furniture or architecture, and interactive science education, one example being a physically responsive kit of optical components that can form themselves into functional arrangements under user control.

There is ample precedent to show that a rethinking of the physical interface to the computer can lead to a profound change in the use of computers in society. This is logical: Having evolved as physical creatures, our reasoning skills are tightly coupled to our perceptual skills. For example, as computer output has shifted from low fidelity text displays to high resolution full color displays, there has been a corresponding shift not only in the way we interact with computers, but in our very uses of computers. A striking example of this has been the recent great increase in computer use by the general populace, and the rapid and widespread adoption of the World Wide Web that occurred as soon as hyperlinked images were implemented in browsers.

The benefits of passive (non-actuated) physical objects in a user interface have been demonstrated by many researchers, including [Robert J. K. Jacob, Hiroshi Ishii, Gian Pangaro, and James Patten, A Tangible Interface for Organizing Information Using a Grid CHI 2002 Conference on Human Factors in Computing Systems Minneapolis, Minn. 20-25 Apr. 2002; James Patten, Hiroshi Ishii and Gian Pangaro: Sensetable: A Wireless Object Tracking Platform for Tangible User Interfaces CHI 2001 Conference on Human Factors in Computing Systems Seattle, Wash., USA Mar. 31-Apr. 5, 2001; Hiroshi Ishii, Brygg Ullmer: Tangible Bits: Towards Seamless Interfaces between People, Bits and Atoms. CHI 1997: 234-241; G. Fitzmaurice, H. Ishii, and W. Buxton, "Bricks: Laying the Foundations for Graspable User Interfaces, Proceedings of CHI'95 (1995), pp. 442-449, all of which are incorporated by reference herein.

Several other research groups have made enabling technologies for planar manipulation of physical objects. Each of these systems has a particular limitation or deficiency which precludes implementation at reasonable cost for simultaneous planar manipulation of many objects.

The only approach that has been demonstrated to work on simultaneous planar transport of multiple objects is the Universal Planar Manipulator by Dan Reznik at Berkeley [D. Reznik, "The Universal Planar Manipulator", Ph.D. Thesis, UCBerkeley, EECS, October 2000; D. Reznik and J. Canny, "Universal Part Manipulation in the Plane with a Single Horizontally-Vibrating Plate", 3rd International Workshop on Algorithmic Foundations of Robotics (WAFR), Houston, Tex., March, 1998, both of which are incorporated by reference herein.] This system creates small vibratory movement of the surface, exploiting the non-linearity of friction to "shake" objects along a table surface. By time-slicing the vibration patterns, each object can be addressed individually and made to follow an independent trajectory. The major advantages of this approach are that it works with any object, and that it is relatively inexpensive.

The deficiency of this approach is that maximum speed of object movement decreases linearly with the number of objects. Since the frequencies used require approximately 10 milliseconds to address one object, only a small number of objects can be simultaneously moved at interactively useful speeds. Also, the presence of an unavoidable continual vibration of the entire table precludes the use of this system where such vibration would be considered objectionable. The system is also inherently limited to be operable only on horizontal surfaces.

The Actuated Workbench at MIT is a table consisting of a packed array of electromagnets. By varying the relative strengths of these magnets, ferromagnetic objects can be manipulated by being handed along between neighboring magnets [Gian Pangaro, Dan Maynes-Aminzade, Hiroshi Ishii The Actuated Workbench: Computer-Controlled Actuation in Tabletop Tangible Interfaces UIST 2002 Symposium on User Interface Software and Technology Paris, France, Oct. 27-30, 2002, incorporated by reference herein]. The advantage of the actuated workbench is its lack of moving parts, and the fact that every location on the surface always contains an actuator.

Its deficiencies include a relatively weak effective force (only movement of carefully chosen lightweight objects has been demonstrated) and large weight of the packed electromagnets, which increases linearly with surface area.

The Virtual Vehicle is a tabletop packed with a checkerboard array of computer-controlled motor-actuated protruding rollers that alternate between two orthogonal directions (rollers at even squares are perpendicular to those at odd squares). Each protruding roller is independently drivable; objects are translated or rotated by varying the rotation of subsets of rollers [J. Luntz, W. Messner, and H. Choset Virtual Vehicle: Parcel Manipulation and Dynamics with a Distributed Actuator Array Proceedings of the SPIE International Symposium on Intelligent Systems and Advanced Manufacturing, Sensors and Controls for Advanced Manufacturing, Vol. SPIE 3201, 1997, incorporated by reference herein].

This mechanism shares with the Universal Planar Manipulator the property that unprepared objects may be transported—objects need not be ferromagnetic.

Disadvantages are that the mechanical complexity and cost are relatively high, increasing linearly with unit area. Only a small demonstration unit has been made; it is not clear that it would be practical to scale this device up to cover a large surface.

The Courier Robot project at CMU [A. Quaid and A. Rizzi Robust and Efficient Motion Planning for a Planar Robot Using Hybrid Control IEEE International Conference on Robotics and Automation 2000, Vol. 4, April, 2000, pp. 4021-4026; R. Hollis and A. Quaid An Architecture for Agile Assembly American Society of Precision Engineering 10th Annual Mtg, October, 1995, both of which are incorporated by reference herein] consists of a two directional planar (Sawyer) motor in which the stator is an entire tabletop and the rotor is a self-contained vehicle running a sophisticated closed-loop control that rides atop a very thin air gap. This approach allows extremely rapid and finely controlled movement. However, courier robots are really designed for the speed and precision required for precision assembly in miniature table-top factories. The high cost per vehicle, and per unit area of tabletop, as well as the power cabling needed for each vehicle, preclude their use in the user interface context which is the focus of this proposal.

SUMMARY OF THE INVENTION

The present invention pertains to a system for manipulation of objects. The system comprises N objects, where N is greater than or equal to 2 and is an integer; and means for controlling and 2D locating of the N objects.

The present invention pertains to a method for manipulating objects. The method comprises the steps of receiving information from N objects, where N is greater than or equal to 2 and is an integer, at a centrally controlling and 2D locating controller; determining 2D locations by the controller of the N objects; and transmitting from the controller directions to the N objects for the N objects to move. Preferably, the transmitting step includes the step of transmitting from the controller kinematic parameters to the N objects.

The present invention pertains to an apparatus for tracking. The apparatus comprises N objects, where N is greater than or equal to 2 and is an integer, each object having an emitter which emits light; and means for 2D sensing of the N objects over time from the light emitted by each emitter. The apparatus preferably includes a planar element on which the N objects are disposed, and wherein the sensing means includes at least 2 1-D sensors that sense the light emitted from the edge of the planar element on which the objects are disposed.

The present invention pertains to a method for tracking. The method comprises the steps of emitting light from N objects, where N is greater than or equal to 2 and is an integer; and sensing 2D locations of the N objects over time from the emitted light from the N objects. Preferably, the sensing step includes the step of sensing 2D locations of the N objects over time from the emitted light from the N objects through an edge of a planar element on which the N objects are disposed.

BRIEF DESCRIPTION OF THE DRAWINGS

In the accompanying drawings, the preferred embodiment of the invention and preferred methods of practicing the invention are illustrated in which:

FIGS. 4a, 4b and 4c show the relationship between the sensing and communications timing of the system.

DETAILED DESCRIPTION

Figure 1:
FIG. 1 is a computer generated drawing showing the system of the present invention in use.
Figure 3:
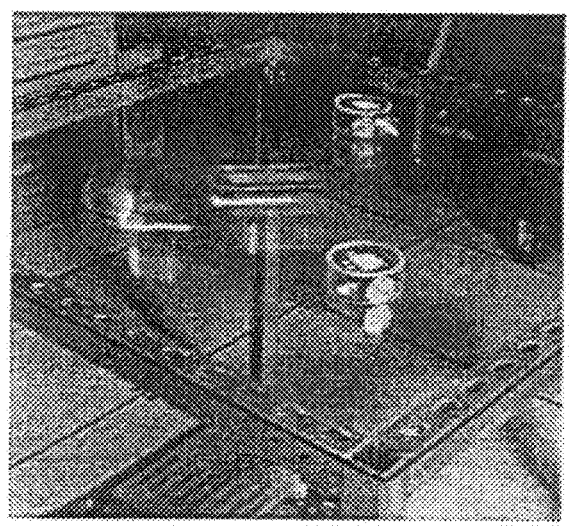
FIG. 3 is a computer generated drawing of the system in use.
Figure 2:
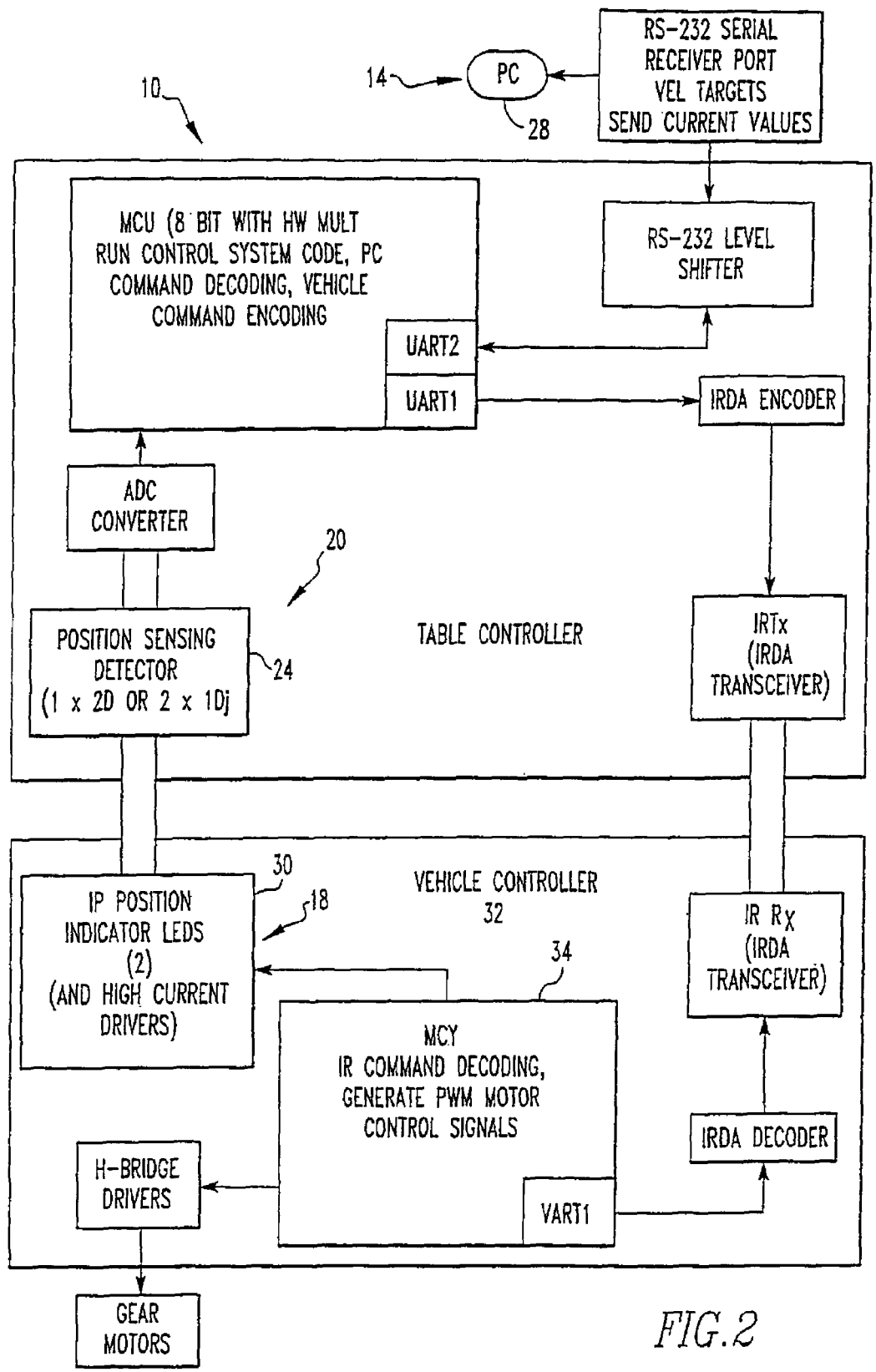
FIG. 2 is a block diagram of the system architecture.
Figure 10:
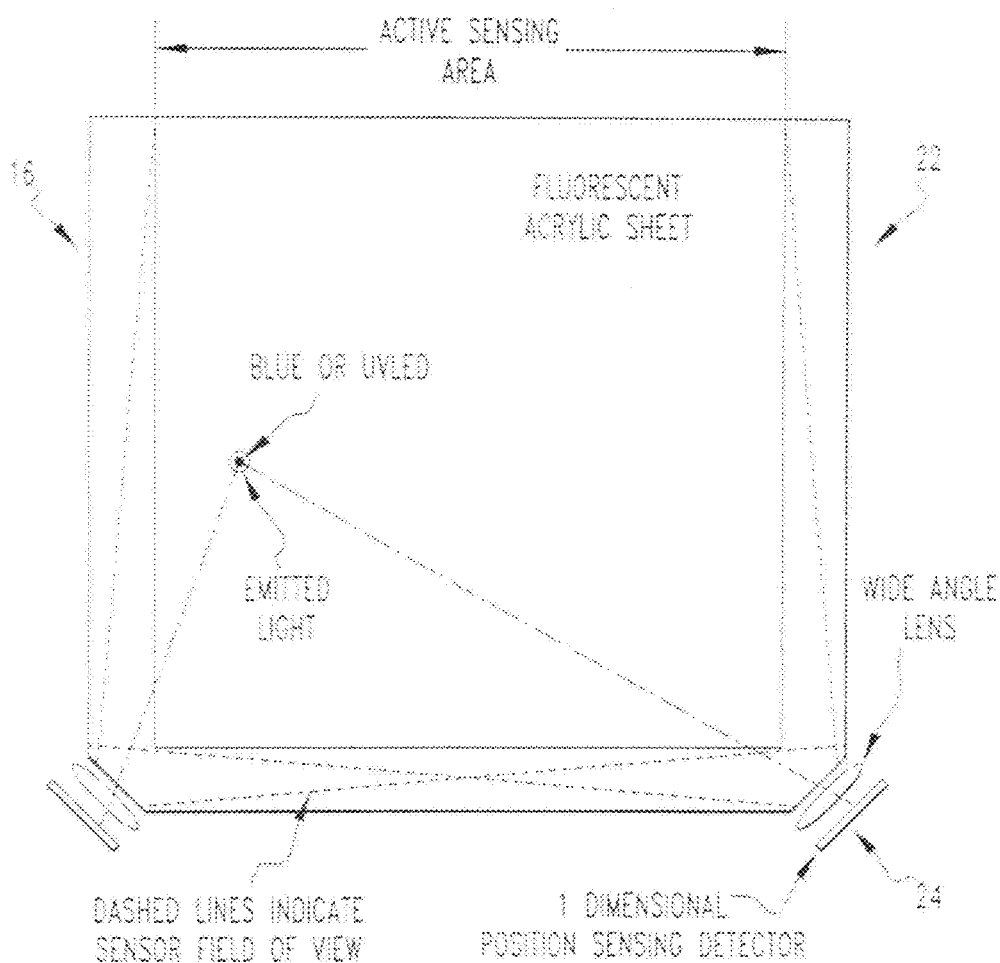
FIG. 10 is a schematic representation of an edge viewing diagram.

Referring now to the drawings wherein like reference numerals refer to similar or identical parts throughout the several views, and more specifically to FIGS. 2 and 10 thereof, there is shown a system for manipulation of objects. The system comprises N objects, where N is greater than or equal to 2 and is an integer; and means for controlling and 2D locating of the N objects.

Preferably, the controlling means 14 includes indicators disposed on the object 12. The controlling means 14 preferably includes sensing means 20 for locating the objects 12. Preferably, the position indicators include emitters 18 which indicate a position of an object 12. The objects 12 are preferably vehicles 26.

Preferably, the controlling means 14 includes a vehicle controller 32 disposed with each vehicle 26. The vehicle controller 32 of each vehicle 26 preferably includes an MCU 34. Preferably, the sensing means 20 includes sensors 24. The emitters 18 preferably include LEDs 30.

The present invention pertains to a method for manipulating objects. The method comprises the steps of receiving information from N objects, where N is greater than or equal to 2 and is an integer, at a centrally controlling and 2D locating controller; determining 2D locations by the controller of the N objects; and transmitting from the controller directions to the N objects for the N objects to move. Preferably, the transmitting step includes the step of transmitting from the controller kinematic parameters to the N objects.

The present invention pertains to an apparatus for tracking. The apparatus comprises N objects, where N is greater than or equal to 2 and is an integer, each object having an emitter which emits light; and means for 2D sensing of the N objects over time from the light emitted by each emitter. The apparatus preferably includes a planar element on which the N objects are disposed, and wherein the sensing means includes at least 2 1-D sensors that sense the light emitted from the edge of the planar element on which the objects are disposed.

The present invention pertains to a method for tracking. The method comprises the steps of emitting light from N objects, where N is greater than or equal to 2 and is an integer; and sensing 2D locations of the N objects over time from the emitted light from the N objects. Preferably, the sensing step includes the step of sensing 2D locations of the N objects over time from the emitted light from the N objects through an edge of a planar element on which the N objects are disposed.

In the operation of the invention, the basic approach is to move each object upon the surface by a small telemanipulated wheeled vehicle. Each vehicle is inexpensive, unobtrusive and independently controllable. Each vehicle is designed to be extremely simple and inexpensive.

A central processor telemanipulates all vehicles. This process is done within successive update cycles; the duration of each cycle is on the order of five or ten milliseconds. Within each update cycle, each vehicle's current location and orientation are detected by a central processor; the central processor then specifies, for each vehicle, a velocity for each of the vehicle's drive wheels.

Each cycle is temporally divided into successive time slices; each time slice is assigned to a single vehicle, during which all communication between that vehicle and the central processor takes place. Individual vehicles possess no model of their own position. Rather, a vehicle transmits its position and orientation to the central processor by successively flashing LEDs mounted upon the vehicle's chassis. The central processor computes the position and orientation of the vehicle from the measured positions of these LEDs.

In one preferred embodiment, the surface is a table, and each vehicle forms a mobile coaster upon which objects may be placed. The display mechanism is quiet and rugged and its physical footprint less obtrusive. Power limitations are removed via an improved means for distributing electrical current to each vehicle, and to enable the display to be able to function as a vertical wall surface, if desired.

A bulky tracker is replaced by a form of position tracker which operates entirely within the table surface itself.

A sealed design, places vehicles between top and bottom surfaces, with objects put upon thin 'coasters' on the top surface. This design eliminates the problem of vehicle recharging, reduces noise, and allows a for portable, self-contained device.

These improvements are discussed below.

More specifically, as shown in FIG. 2, the architecture includes four major components: vehicles, including their mechanical and electrical subsystems, a table controller, position sensing opto-electronics, and a standard PC.

The position sensing subsystem includes a lens, a position sensing device (PSD) and an amplifier. The positions of LEDs on the vehicles, imaged onto the PSD, generate corresponding voltages, which are read by the table controller via an analog to digital converter (ADC).

A proportional, integral, derivative (PID) control system running on the table microcontroller (MCU) compares these values with a desired vehicle trajectory sent from the host PC. The output from the control system is a set of speed commands for the two geared DC motors on the vehicle. Commands are sent via 115,200 bps infrared communication link based on the IRDA physical layer.

A communications protocol implemented between the host PC and the table controller allows a PC application to specify vehicle trajectories and position. Software components with hard real-time requirements are implemented in the table MCU, whereas application code is implemented on the PC, benefiting from that platform's greater resources and superior development tools.

Both the table controller and the vehicle are designed around ATMEL AVR™ series 8-bit microcontrollers.

Figure 4A:
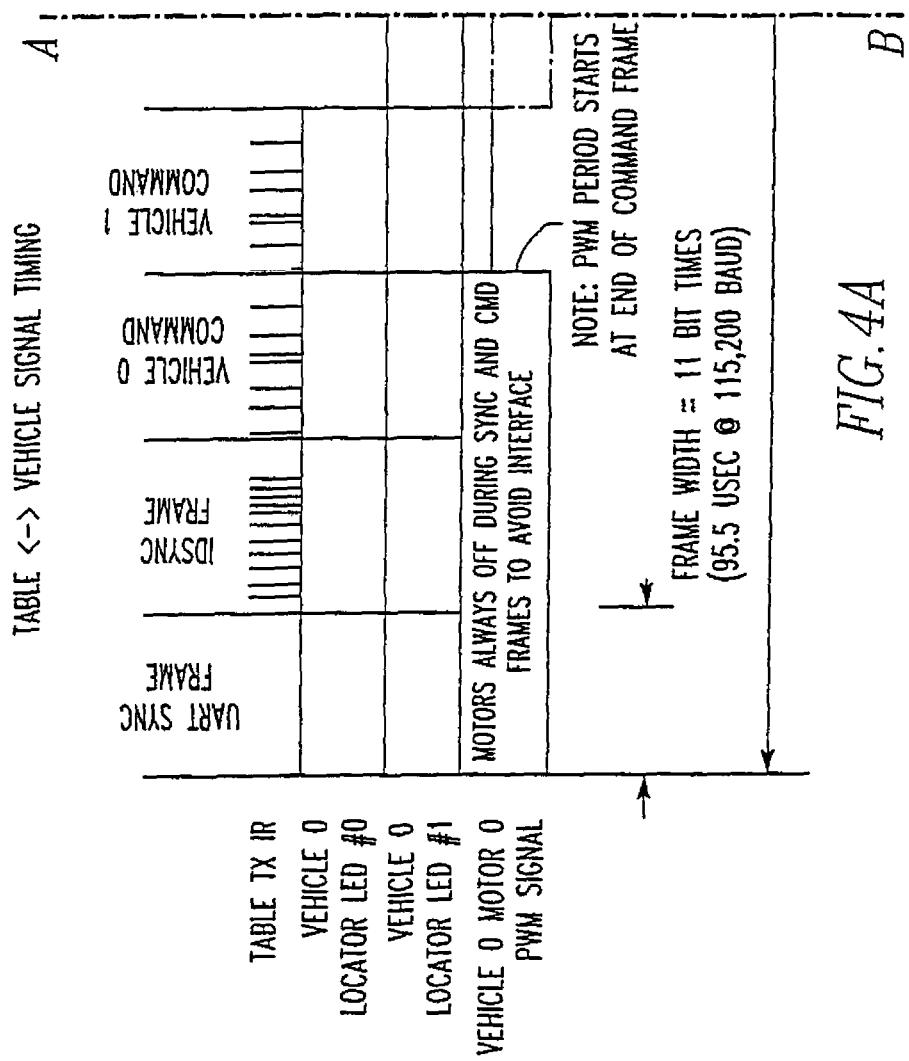
Figure 4C:
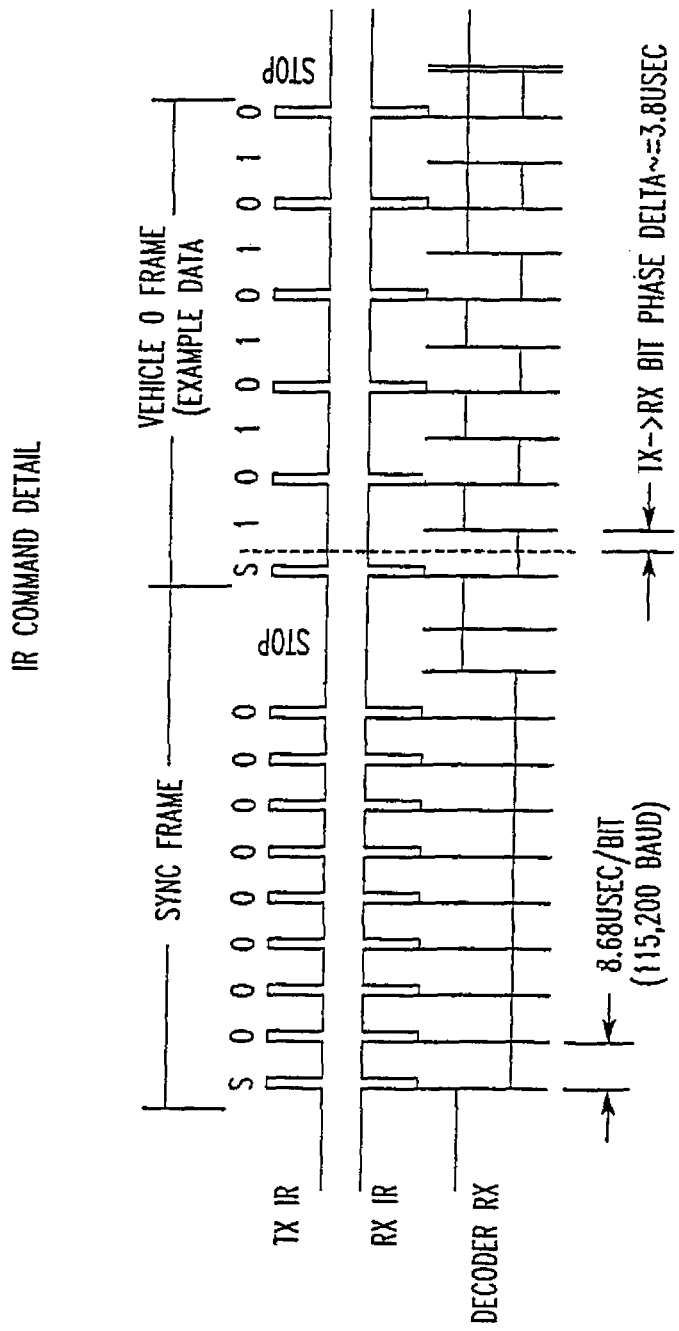

Vehicle position sensing and communication between the vehicle and table controller are interleaved within a system update cycle, as shown in FIGS. 4a-4c. In each of these cycles, every vehicle has its position sensed and receives new motor commands. Each vehicle is assigned a separate ID [0, N-1], and this determines the intervals within the cycles ('frames') when it must pulse its locator LEDs and listen for motor commands. When a vehicle is placed on the table, it first synchronizes with the update cycle by waiting for a unique 'sync byte'. A blank frame prior to the sync frame insures that the UART on the vehicle can find the start bit of the sync frame reliably.

The period of the update cycle is determined by the maximum number vehicles (N) in any configuration and the length of each frame (Tframe):

$$T\text{update}=T\text{frame}*(3N+2)$$

With current values for Tframe (95.5 microseconds) and N (15), Tupdate is around 4.5 milliseconds.

Methods for increasing the maximum number of sensed vehicles are described below.

Figure 5:
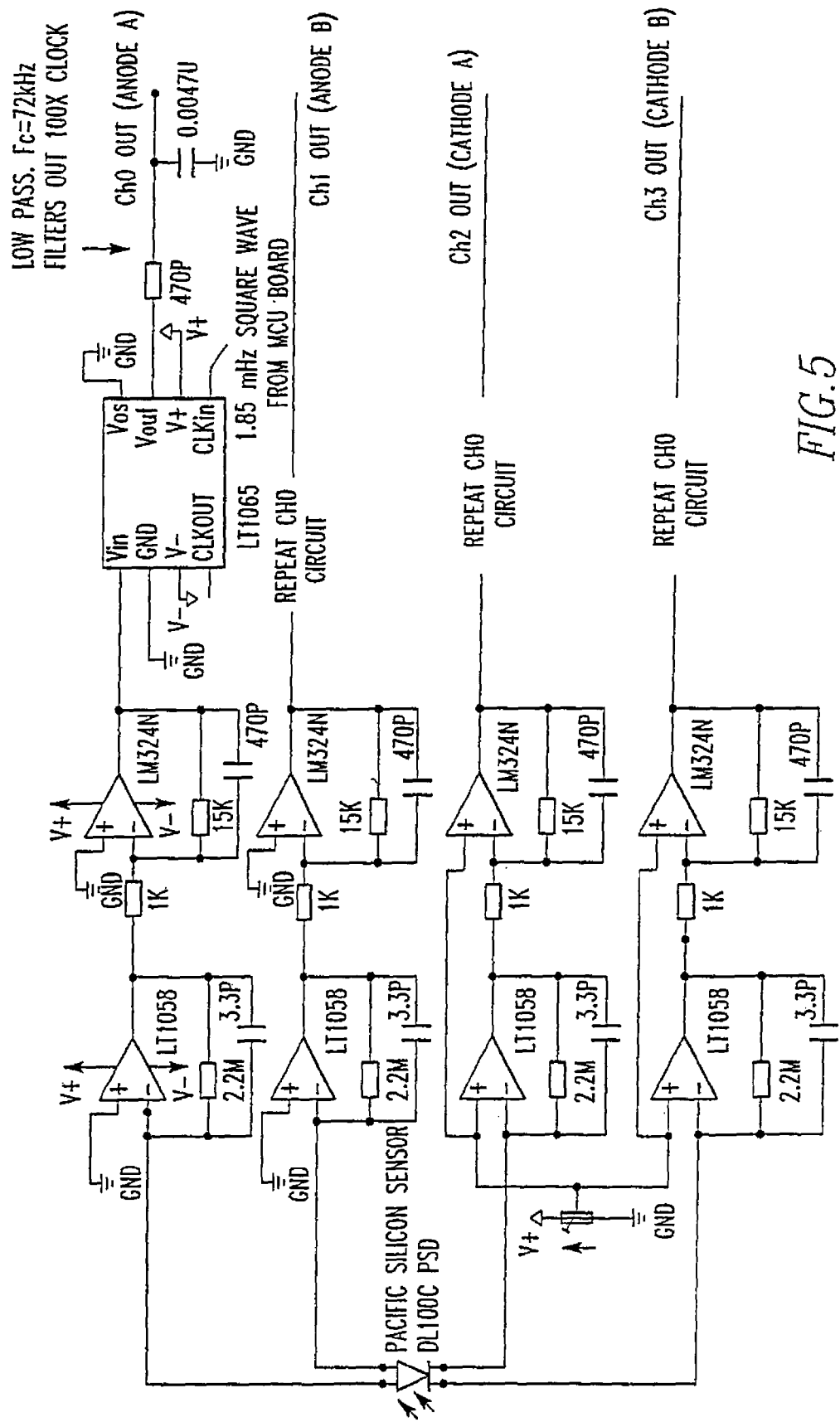
FIG. 5 is a schematic representation of a position sensing detector.
Figure 6A:
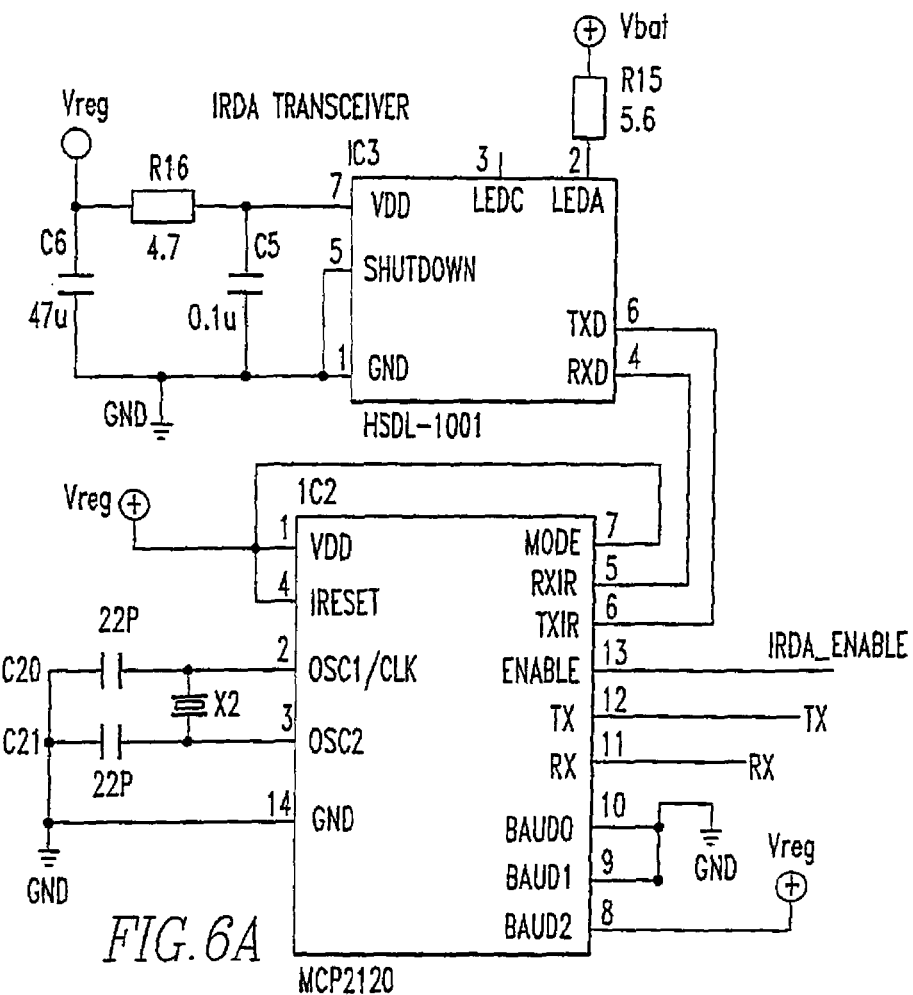
FIGS. 6a, 6b, 6c, 6d, 6e, 6f and 6g are schematic representations of components of the vehicle of the system.
Figure 6B:
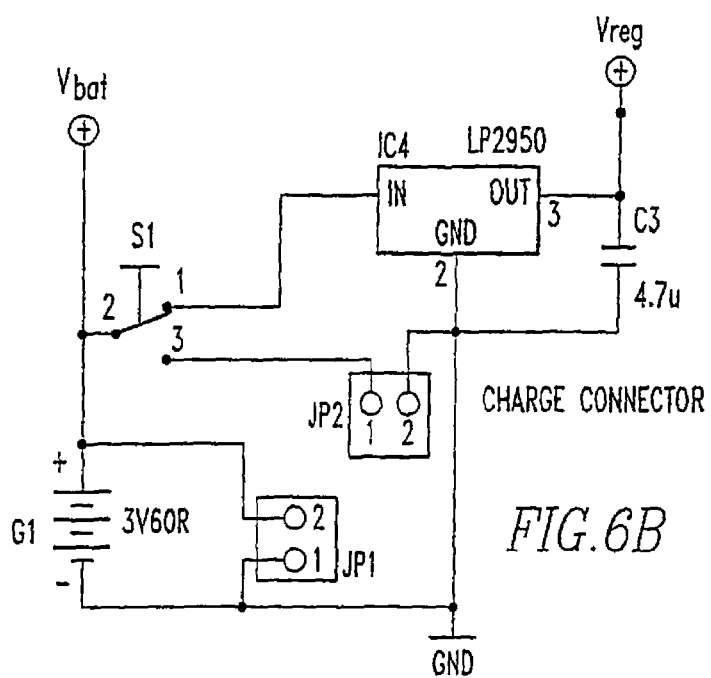
Figure 6C:
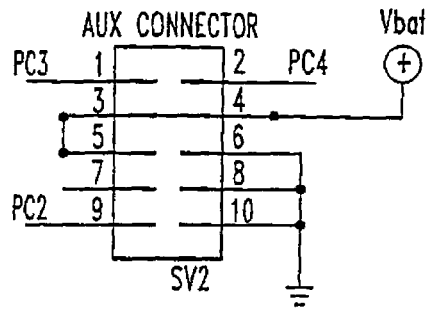
Figure 6D:
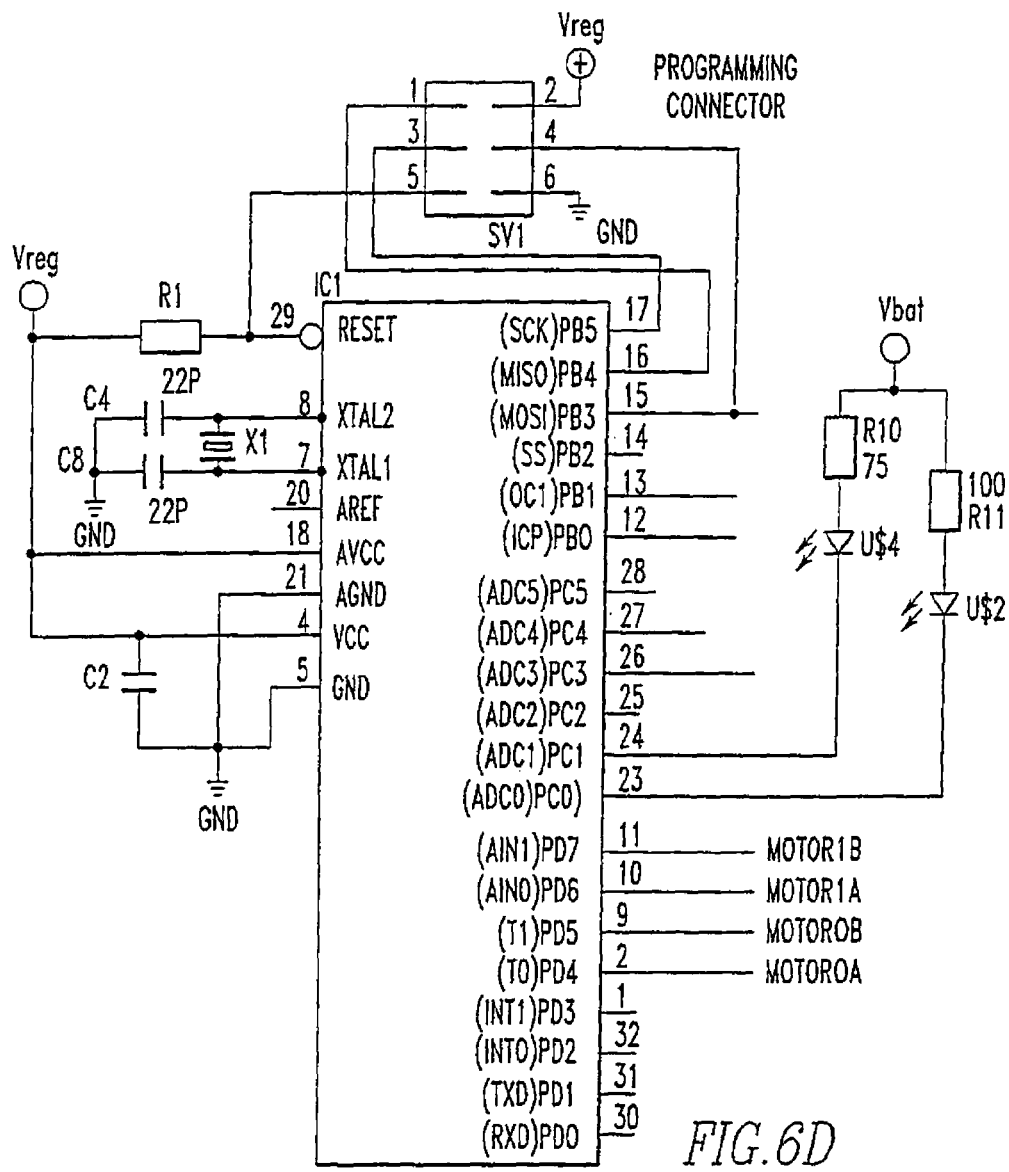
Figure 6E:
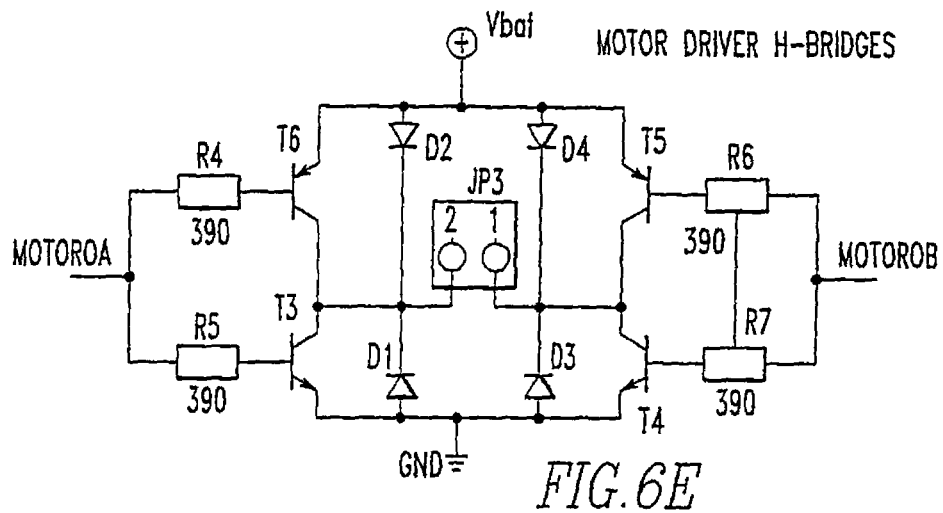
Figure 6F:
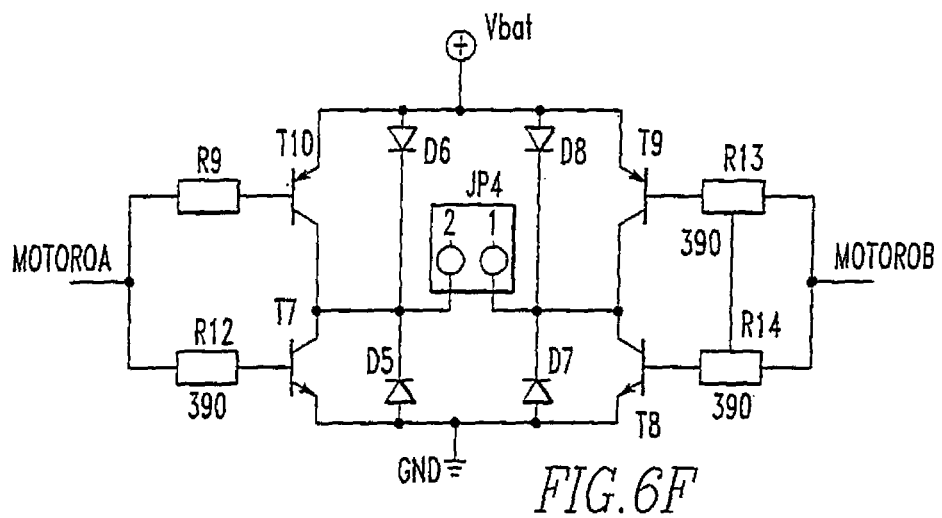
Figure 6G:
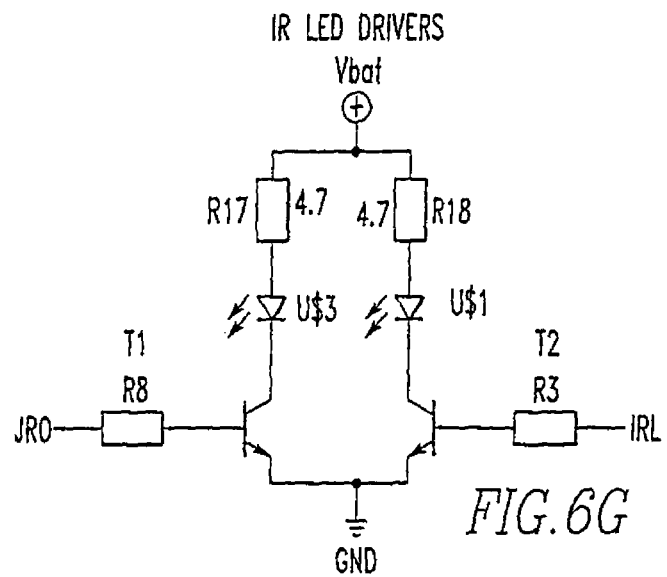
Figure 7A:
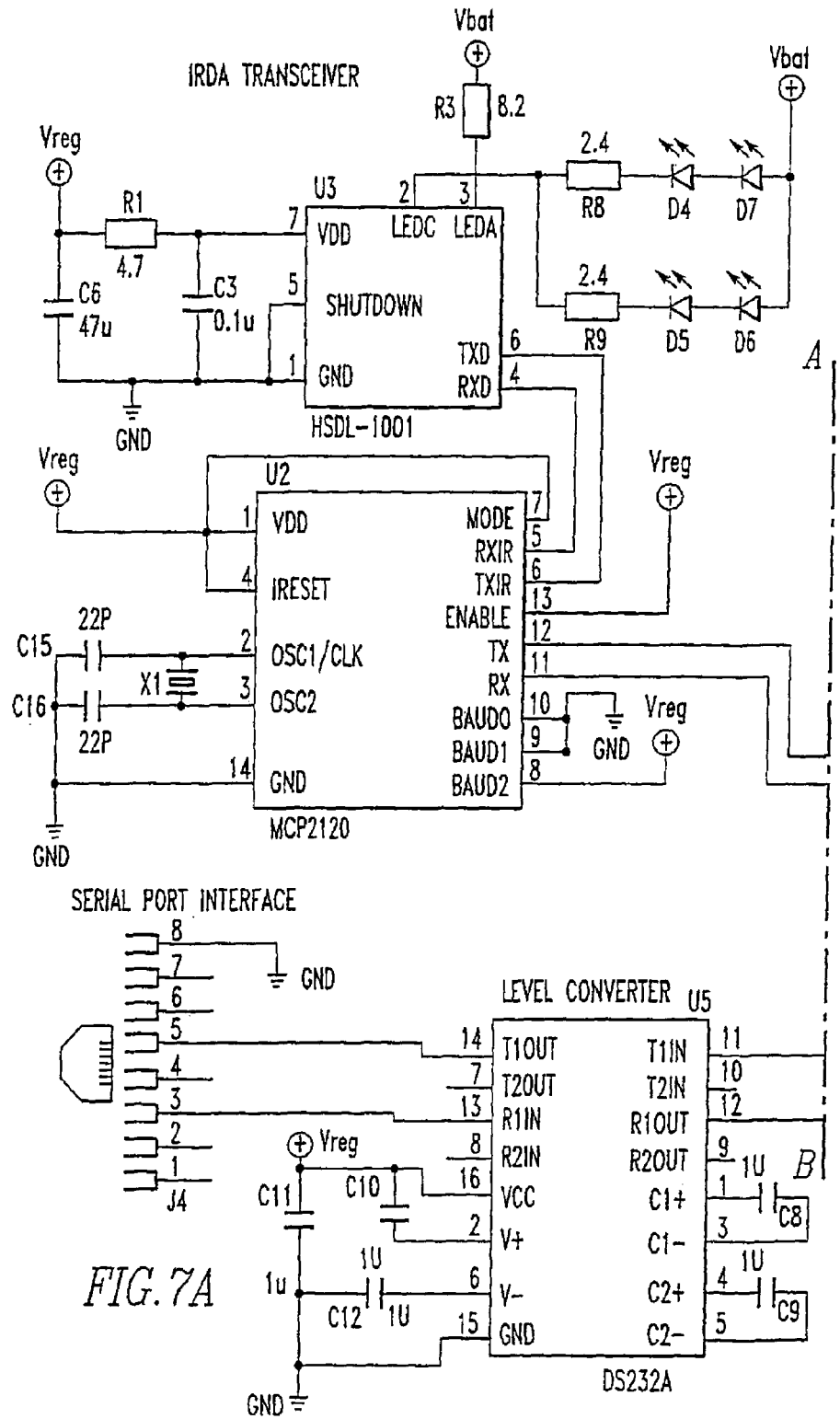
FIGS. 7a, 7b, 7c and 7d are schematic representations of a table controller.
Figure 7B:
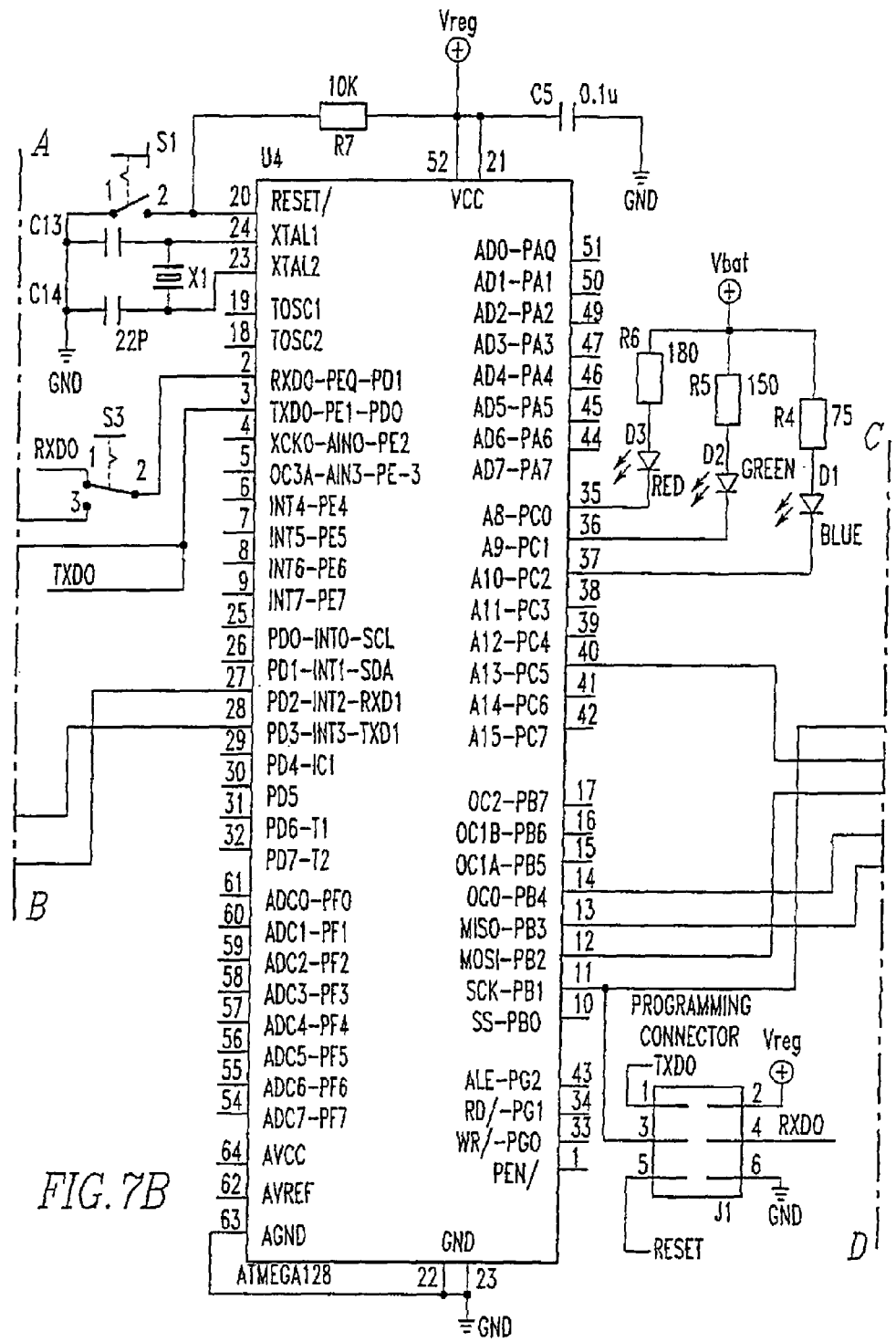
Figure 7D:
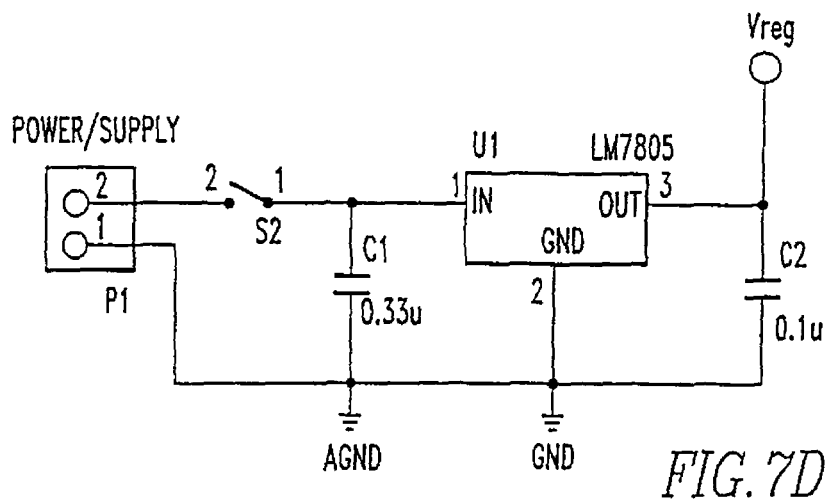
Figure 7C:
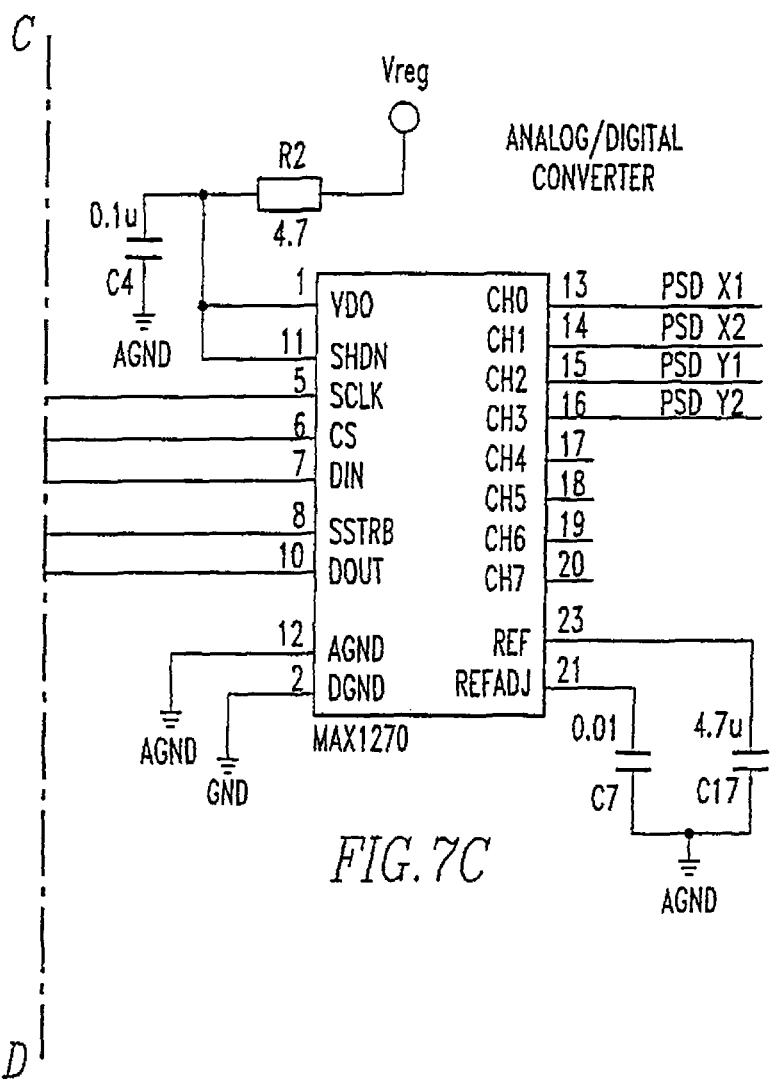
Figure 8A:
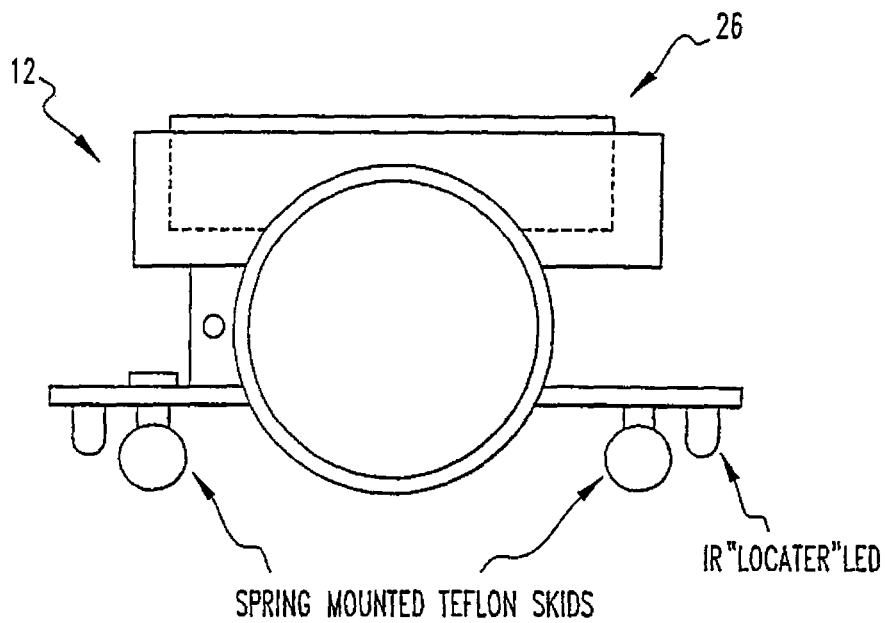
FIGS. 8a, 8b, 8c and 8d are schematic representations of the vehicle mechanical design.
Figure 8B:
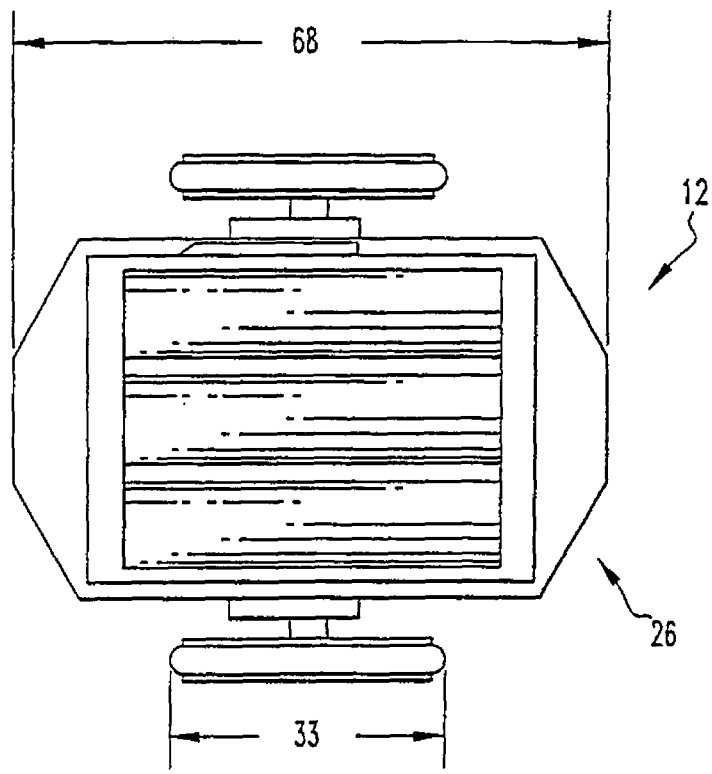
Figure 8C:
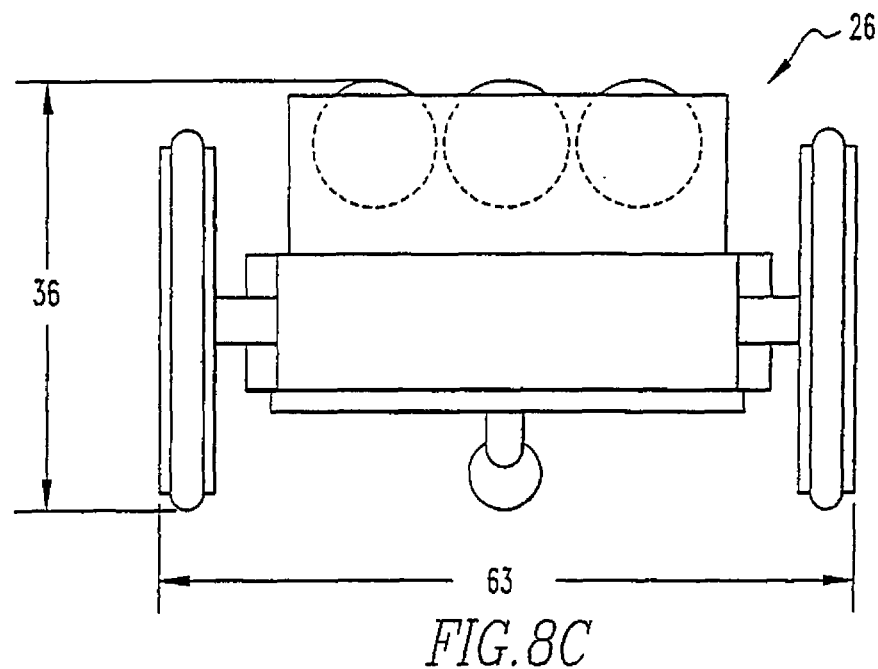
Figure 8D:
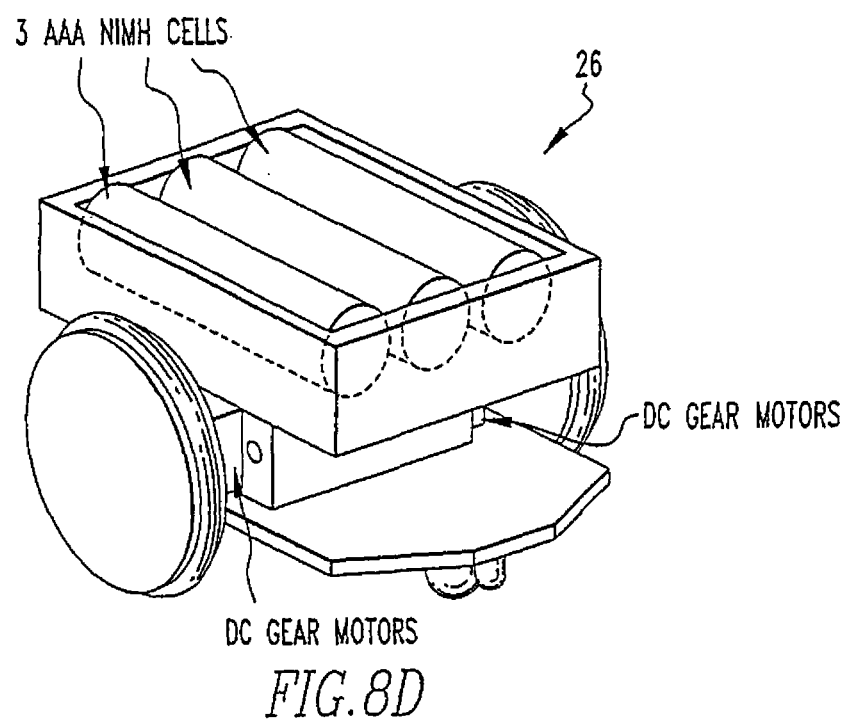

The position sensing subsystem includes a lens, a position sensing detector (PSD)—also known as a lateral-effect photodiode—and a custom-built amplifier, as shown in FIG. 5. Two infrared LEDs, located underneath the vehicle, are separately pulsed as described above. The lens, situated roughly 80 cm below the 1 m square table, images the LEDs' outputs onto the surface of the PSD. Low-level currents developed at the PSD are amplified and filtered to remove noise and interfering signals, and then read by the table controller via an analog to digital converter (ADC).

The photoconductive mode of the PSD is used. Each of the four PSD terminals is connected to a transimpedance amplifier stage with a gain of 2.2M V/A implemented with a low bias current FET Op Amp. A subsequent stage provides an additional 15× voltage gain. Low-pass filtering at each stage and a fifth-order Bessel switched capacitor filter IC, roll-off amplifier frequency response steeply after the first few harmonics of the locator pulses. An optical filter over the PSD removes light outside the infrared region.

A precision ADC on the table controller converts the output voltages of the PSD amplifier into digital values read by a microcontroller on the table controller board. Non-linearities in the PSDs output as a function of position are unwarped by performing a 2D interpolation through a table generated from calibration data. The unwarped values are then used to compute X and Y positions for each diode and, in turn, an orientation for the vehicle.

The functions required of the vehicle's electronics are minimal—primarily reception of motor commands, varying motor voltage on the basis of those commands, and synchronizing with the system update cycle. No sensing and only minimal computation are performed locally, as shown in FIGS. 6a-6g.

An IRDA endec IC, converts the IRDA format signal from the transceiver into an asynchronous serial bit stream. The MCU's internal UART recovers bytes from the stream for interpretation as motor commands.

Two H-bridge driver circuits enable bi-directional control of the vehicle's DC motors. PWM control signals from the MCU set the average voltage seen by the motor by varying the duty cycle in proportion to the value of the received motor command. Two LED control circuits enable the infrared LEDs to be driven at high current (approximately 300 mA) by low-current MCU output pins.

Both the motor and LED circuits are powered directly by a 3.6V (nominal) NiMH rechargeable battery. A 3.0V low-dropout regulator powers the rest of the vehicle's electronics and helps to isolate the sensitive IRDA transceiver from power supply noise generated by the motor and large LED current pulses.

The primary components of the table controller are an Atmel ATMega128 MCU, a Maxim MAX1270 12-bit ADC, and an IRDA transceiver and endec, as shown in FIGS. 7a-7d.

The ADC is connected to the four output channels (x1, x2, y1, y2) of the PSD amplifier. The MCU directs the ADC to sample each of these channels once per LED locator pulse frame. A serial protocol (SPI) is used for communication between the MCU and the ADC IC.

Motor commands from the MCU's control system are encoded into IRDA format by the endec IC and transmitted by the transceiver.

The table controller communicates to the PC via a RS232 serial link. The link is implemented with the MCU's second UART, connected through a DS232 voltage level converter to the PC serial port.

The vehicle for the active table is built on a circular platform, with two driven wheels connected to small DC gear motors, as shown in FIGS. 8a-8d. Power is supplied by three 700 mAh AAA NiMH cells, which can power the vehicle for two to ten hours, depending on motor use. The printed circuit board which contains the vehicle's circuitry also acts a chassis, providing a rigid frame onto which mechanical components are attached.

Turning is achieved by 'differential steering', whereby vehicle rotational rate is dictated by the difference in the velocity of the wheels. Spring loaded Teflon casters stabilize the vehicle vertically, while slipping sideways to allowing planar motion.

The vehicle is covered by a capped cylindrical shell, onto which the models used in a particular application are placed.

In the position sensing method, an object to be tracked travels across a surface made of acrylic plastic sheet which is doped with a fluorescent dye. The object directs light from an attached LED, whose wavelength is in the absorption band of the dye, into the plastic sheet. The absorbed light is reemitted at a longer wavelength, creating a narrow light source inside the plastic beneath the LED. Since the plastic is nearly transparent to light at its emission peak, little of the emitted light is absorbed by the material.

Figure 9:
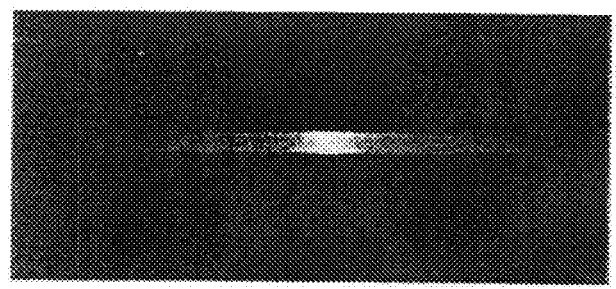
FIG. 9 is a computer generated drawing of an edge view image.

The sheet acts as light pipe, directing most of the emitted light to its edges, where it appears as tapered vertical band. This effect is visible in FIG. 9. (The image was made by illuminating a sheet of orange-emitting fluorescent acrylic with a blue LED held against the sheet's surface, and then viewing the sheet from its edge.)

This band is imaged through a wide angle lens onto the surface of one-dimensional position sensing detectors (PSDs) placed at two cut corners of the sheet. The position of the centroid of the band imaged onto the PSD is computed from the currents measured at the PSDs terminals. FIG. 10 illustrates the overall configuration.

The edge-emitted light pattern has the symmetric intensity pattern required to properly locate its center. Measurement of received optical power, indicate moderately weak signals will be present at the PSD and will therefore require a high-gain, low noise amplifier. Careful matching of fluorescent dye, LED, and PSD characteristics can be expected to improve signal strength.

The primary benefit of this method is that it requires no additional depth beyond the thickness of the table surface, eliminating the need for a bulky tracker. It enables the construction of an Planar Manipulator Display as a self-contained 'slab' which can be placed on top of any suitable desk or table. Additionally, the sensing elements used are both simple and manufactured in high volume for other applications, and consequently are very inexpensive.

An open variant of the design is a direct adaptation of the edge viewing method, where objects attach directly to mounting bases on vehicles. This variant in its simplest form would include rechargeable batteries in vehicles, perhaps with a recharging 'station' to which a vehicle could go when its voltage was low. Inductively coupled power delivery across the table surface is also used. This makes possible to eliminate or at least reduce the size of the on-board battery.

Figure 11:
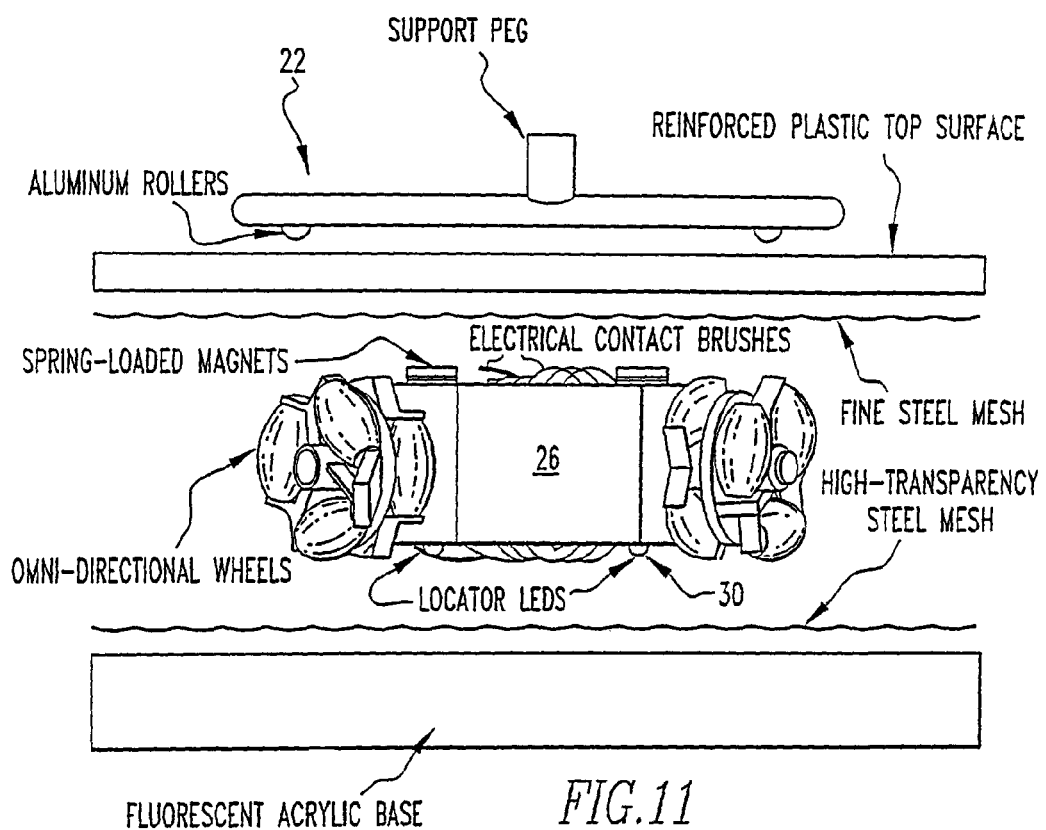
FIG. 11 is a schematic representation of a sealed variant of the system.

The sealed version, as shown in FIG. 11, of the slab design places vehicles between top and bottom surfaces. Objects are put upon thin coasters on the top surface. These coasters are magnetically coupled to vehicles inside the table and travel on small rollers to minimize friction.

Vehicle power is supplied on fine metal meshes inside the top and bottom surfaces which are at different DC potentials. Flexible metal contact brushes electrically connect the vehicle to the meshes, while reducing sensitivity to variations to in surface height. High transparency steel mesh is used between the vehicle and the position sensing surface. http://www.twpinc.com/high_trans.html, incorporated by reference herein.

The sealed variant, while more complex, could provide several important advantages over the unsealed version. Delivering power to directly to each vehicle eliminates the per-vehicle cost of rechargeable cells, and eliminates problem of recharging. It also eliminates trade-offs between vehicle performance, mass, and battery life. Vehicle performance becomes limited only by power density of available motors.

By decoupling vehicles and the object platforms ('coasters'), this architecture allows a "client/server" arrangement, in which there is a pool of available vehicles within the surface. These vehicles can be programmed to work cooperatively to move large or articulated objects. This decoupling also eliminates potential vehicle damage as users manipulate objects.

Finally, a sealed design would reduce noise, and allow us to build more self-contained, portable devices, which could simply be picked-up and moved as one unit.

The primary challenge that arises from the unsealed approach is that it creates the need to track coasters separately from vehicles. Potential solutions for this problem are addressed in the next section.

The methods available to sense user control of objects depend on the physical design of the table. In configurations where the object is mechanically coupled to the vehicle, it is possible to detect when users pick up and move objects by monitoring the error between the commanded and measured motion of the vehicles. In the simplest case, when a vehicle which has been commanded to stop is nonetheless in motion, it can be assumed that the user is moving the vehicle.

Where the object and vehicle can become uncoupled, alternate methods are necessary. Direct tracking of coaster positions could be implemented by adding locator LEDs to coasters and putting the sensing surface (e.g. fluorescent acrylic sheet) between the vehicles and the coaster. Coasters would need to carry batteries, but due to the very low duty cycle of the LED locator signal and consequently low average current, run time of approximately ten hours (continuous operation) should be possible between recharges for appropriately sized NiMH cells.

A second alternative for the sealed configuration is to use computer vision techniques to track objects and coasters. This could be developed in conjunction with the gesture tracking subsystem described elsewhere in this document.

There are several possible approaches to maintaining high update rates with larger number of vehicles up to 100 vehicles.

The most direct approach is to make the length of the frames in which LEDs are pulsed shorter than the length of the communications frames. For example, changing the pulse time to ten microseconds—easily achievable with available ADCs—would allow 84 vehicles to be sensed and controlled at 100 hz.

In addition, the communications rate could be increased to as much 4 Mbps (with some cost impact), leading to a theoretical communications frame width as small as 2.8 microseconds. Though it might be difficult to synchronize vehicles and the table controller well enough to achieve quite this rate, ten microseconds per frame should be quite achievable.

The current scheme interleaves communication and sensing intervals to avoid optical interference between the two sub-systems, which both use infrared light. If the position sensing sub-system were to use light outside the infrared band, it would be possible to use optical filters to separate the two types of signals, and thus enable communication and position sensing to be overlapped. (In fact, the "2-Dimensional Position Sensing by Edge Viewing" method described elsewhere could use visible light.) Combining all three of these methods would allow tracking of 500 vehicles at 100 hz—a large safety margin beyond any physically practical number of vehicles.

The table controller is designed around a more powerful, 32 bit MCU such as the ARM 940T. This will provide the computational resources required to run the larger number of vehicles envisioned.

Figure 12:
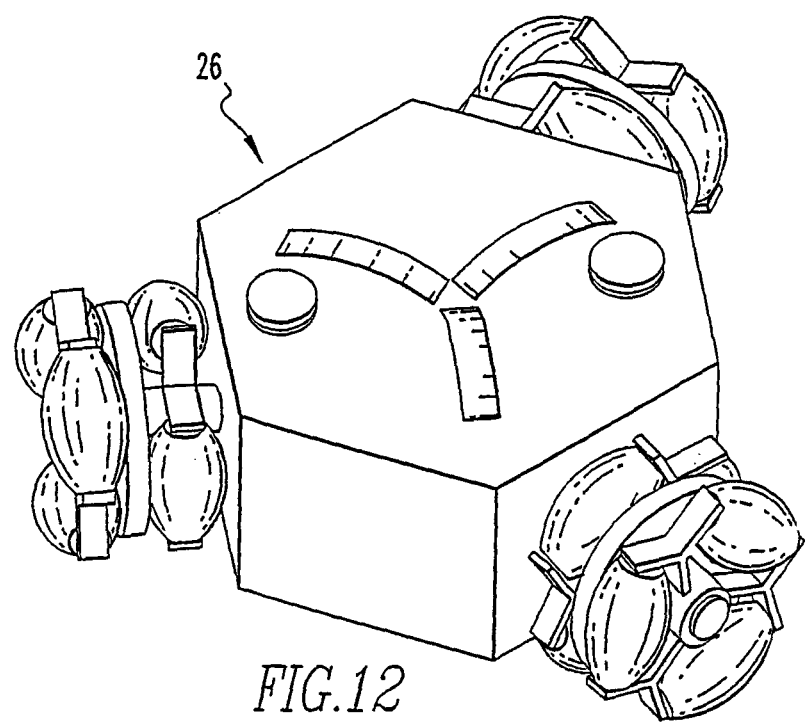
FIG. 12 is a schematic representation to a holonomic vehicle.

Vehicles capable of holonomic motion can be used, as shown in FIG. 12. In this context, holonomic motion refers to the ability of the vehicle to control orientation independently from direction.

This is advantageous for two reasons. First, holonomy greatly simplifies motion control and path planning. Second, it allows direction to be changed much more quickly than is possible with differentially steered vehicles, removing limitations placed on the kinds of motion that can be effected.

For example, in a billiard ball simulation, an elastic collision should change the direction of a ball instantaneously. A differentially steered vehicle would have to rotate in place at the collision point before heading in a new direction—requiring, in effect, the simulation to be stopped momentarily—but a holonomic vehicle could proceed in the new direction immediately (of course subject to limits imposed by its inertia).

The cost associated with these benefits is a small increase in vehicle complexity. A well-known approach to implementing a holonomic vehicle involves the use of three 'omni-wheels' (and associated motors), oriented at 120° intervals, as shown in FIG. 12. [G. Reshko, M. Mason, Rapid Prototyping of Small Robots, Carnegie Mellon University Technical report, 2000, incorporated by reference herein.]

Planar manipulator displays alone will provide a compelling medium for many applications.

The system's functionality as an output device can be reinforced, by making the tabletop surface itself a graphical display device, e.g. by projecting video onto the table from above. Dynamic table graphics should provide a strong sense of context to the presentation provided by physical objects. Adding this, along with other obvious cues such as audio, should more effectively "complete" the simulation for the user.

If the table's strengths are noted as a direct-interaction input device, it is appropriate to consider how the table would be integrated with the other non-contact forms of human input. For instance, what the user might be doing with his/her hand when it is not in contact with the coaster-objects can be involved. This is gesture recognition, and the most appropriately applicable form of this technology would be a passive system, e.g. computer-vision-based—an area which does have a fair amount of mature research [Segen, J. "Gest: A learning computer vision system that recognizes gestures," Machine Learning IV, pp. 621-634, Morgan Kauffman, 1994, edited by Michalski et al.; Segen, J. and S. Kumar. "Gesture VR: gesture interface to spatial reality," SIGGRAPH Conference abstracts and applications, page 130, 1998. Digital Pavilions; Michael Stark, Markus Kohler, and P. G. Zyklop. "Video Based Gesture Recognition for Human Computer Interaction," International Workshop on Modeling—Virtual Worlds—Distributed Graphics", 27.-28, November 1995, all of which are incorporated by reference herein]. One can now envision a scenario for the system where a user might point to an object on the Table, and move it to an opposite corner by merely motioning with his or her finger. This suggests a broad range of applications for users with disabilities.

Additionally, integrating a computer vision system may also address the coaster-tracking problem that arises when the table is implemented in its sealed variant, where coasters can possibly be decoupled from vehicles.

Another natural companion input mode is voice recognition. It could be useful for the Table because it would be used in concert with direct-interaction and gesture recognition.

The following example applications all require simultaneous movement of multiple physical objects upon a plane, under control of an interactive simulation algorithm. Some of them also can benefit from the presence of a front projection down onto the surface.

Military Simulation

In this scenario, miniature military figures can be strategically positioned for attack or defense. Personnel can be made to hide behind buildings, out of the line of sight of enemy combatants. Simulation of exhaustion or other disability can be simulated by limiting maximum speed of travel.

By combining with front-projection onto the surface, it is possible to show possible paths of attack or escape, areas of visibility by the enemy, and time-varying geographic features such as fog cover.

People Flow

The system an be used for applications involving groups or crowds of people. One application is emergency evacuation planning. Another is simulation and examination of how people react in social groups, including social clustering and dominance behaviors.

Emergency evacuation scenarios can be played out, with direct physical visualization of potential areas of congestion.

Vehicle Traffic

Another application is study of traffic flow. This can involve study of strategies for avoiding congestion, of interaction between vehicles and pedestrians, and to determine the effects of variation in policy for city planning, such as sidewalk/crosswalk widths. Simulations of steering and parking strategies can be used to design optimal parking areas, or the effects of introducing oversized vehicles to an area. Physical simulation can be used to compare strategies for dealing with unsafe or DWI drivers.

Furniture/Architecture Arranging

It is possible to look at algorithms for arranging furniture for optimal people flow through an interior. In one scenario, as the user moves a table, chairs rearrange themselves under algorithmic control. Things that can be examined include effects of walking routes and simulations of where people tend to congregate in a room.

When used in conjunction with projection onto the surface, it is possible to examine wind-flow around buildings, dispersal patterns of air contaminants, or how the strength of broadcast radio/microwave signals varies with different arrangements of buildings.

Interactive Optics Education Kit

In this scenario, when the user moves any one optical component, the other optical components shift to maintain optical paths in a simulation. A projection shows the variation in the simulated optical path as the other components are physically moved into place. In general, this approach is well matched to design and implementation of hands-on museum exhibits, encouraging an active "learn by doing" approach to K-12 children's science education.

The current PC programming interface for the planar manipulator display is relatively simple, providing access to vehicle position and orientation, and allowing path waypoints to be commanded. The programming interface can be extended by implementing path planning using established techniques [STOUT, Bryan. The Basics of Path Planning. Game Programming Gems, pp. 254-263. Hingham, USA: Charles River Media, 2000; RABIN, Steve. Speed Optimizations. Game Programming Gems, pp. 272-287. Hingham, USA: Charles River Media, 2000; STERREN, William van der. Tactical Path-Finding. Game Programming Gems 3, pp. 294-306. Hingham, USA: Charles River Media, 2002, all of which are incorporated by reference herein], and by providing support for user-input detection.

A Position Sensing Detector is a type of photodiode whose output represents the position of incident light striking its surface. In general, a PSD consists of two photosensitive layers (the P- and N-type layers) separated by a transparent layer.

One-Dimensional PSD

Figure 13:
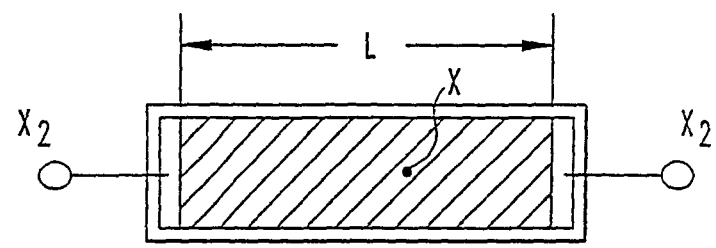
FIG. 13 is a one-dimensional view of the position sensing detector.

In the 1D case, as shown in FIG. 13, two electrodes positioned at opposite ends of the P-layer detect the photocurrent created by photoelectric conversion of light striking the layer. The current at each electrode is inversely proportional to its distance from the incident position of the light. If $X_1$ and $X_2$ represent the current at each electrode, and x is the position of the incident light, then their relationship is described by (1) below.

Two-Dimensional PSD

Several types of 2D PSD are available and are classified by the locations of their electrodes. The duo-lateral type uses two additional electrodes positioned at the edges of the N-layer (at 90° from those on the P-layer relative to the center of the PSD), thus enabling the spot to be located along a second axis. If $Y_1$ and $Y_2$ represent the current at each electrode, and y is the position of the light on the N-layer, then (2) describes their relationship:

$$\frac{X_2 - X_1}{X_1 + X_2} = \frac{2x}{L} \tag{1}$$

$$\frac{Y_2 - Y_1}{Y_1 + Y_2} = \frac{2y}{L} \tag{2}$$

PSD Features

PSD-derived positions depend only on the location of the centroid of the light spot, and are independent of the brightness of the spot or its sharpness. This allows a simple and inexpensive optical design to be implemented. This feature enables the "2-Dimensional Position Sensing by Edge Viewing" method, described herein, which depends on accurately locating the center of a diffuse light pattern. In addition, PSDs are capable of very high-speed operation, with limits dictated primarily by the rise time of the element—often less than one microsecond. With properly designed interface electronics, they can achieve positional resolutions of one part in ten thousand.

Individual vehicles possess no model of their own position. Rather, a vehicle transmits its position and orientation to the central processor by successively flashing two LEDs mounted upon the vehicle's chassis. Light from the LEDs is imaged onto the surface of a two-dimensional lateral-effect photodiode, which through associated analog circuitry, produces voltages which depend on the location of the imaged light on the photodiode's surface.

These output voltages are sampled through an analog to digital converter in synchrony with the pattern of flashes from vehicle LEDs, and enable computation X and Y positions for each LED.

Software in the central processor performs further computation as follows: The line connecting both the positions of the LEDs is translated to the origin of the coordinate system. The angle of this line with respect to the coordinate axis is then computed by:

theta=arctan((y2−y1)/(x2−x1)), where (x1, y1) and (x2, y2) are the coordinates of the first and second LEDs, respectively, and arctan is the inverse tangent function.

There are two other techniques other than fluorescence to solve the problem of getting light to the edge of the sensing surface.

This first of these is to embed reflective particles—glitter—into the otherwise transparent sensing surface. In this technique, some of the light directed downwards by the vehicle-mounted emitters is reflected sideways by these particles and arrives at the edge where it can be sensed. (Of course, some of the light is scattered by other particles before it reaches the edges.)

The second technique is to construct the sensing surface from a clear material, but with geometry designed to maximize total internal reflection inside the surface—i.e. to use it as a 'light pipe'. In this case, the vehicle emitter would be modified to emit light only in the range of angles which would be 'captured' internally by the sheet (i.e. rather than traveling straight through the surface or reflecting off the surface.)

It should be noted that the tracking of objects described herein can be used whether the objects are moved under their own power, or if something or someone moves the objects.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for locating a location of at least one object comprising:
    a planar element having a surface; and
    a plurality of sensors sensing the location of at least the one object outside the planar element based on light that is transmitted through the planar element inside its surface to an edge of the element, the sensors receiving the light from the edge, the sensors include a wide angle lens that directs the transmitted tight to the sensors disposed at cut corners of the element; and
    a processor in communication with the sensors which determines the location of the one object from the sensors.

2. A method for locating locations of a plurality of objects comprising the steps of:
    moving the objects; and
    sensing the locations of at least two of a plurality of objects on a planar object based on light that is transmitted through an edge of the planar element with a plurality of sensors disposed at the edge and appears as a vertical band; and
    determining the locations of the plurality of objects with a processor from the sensors.

3. The apparatus of claim 1 wherein the plurality of sensors sense the locations of at least the one object and another object in a time slot.

4. The method of claim 2 wherein the sensors include a wide angle lens that directs the transmitted light to the sensors disposed at cut corners of the element.

* * * * *